UNITED STATES PATENT OFFICE.

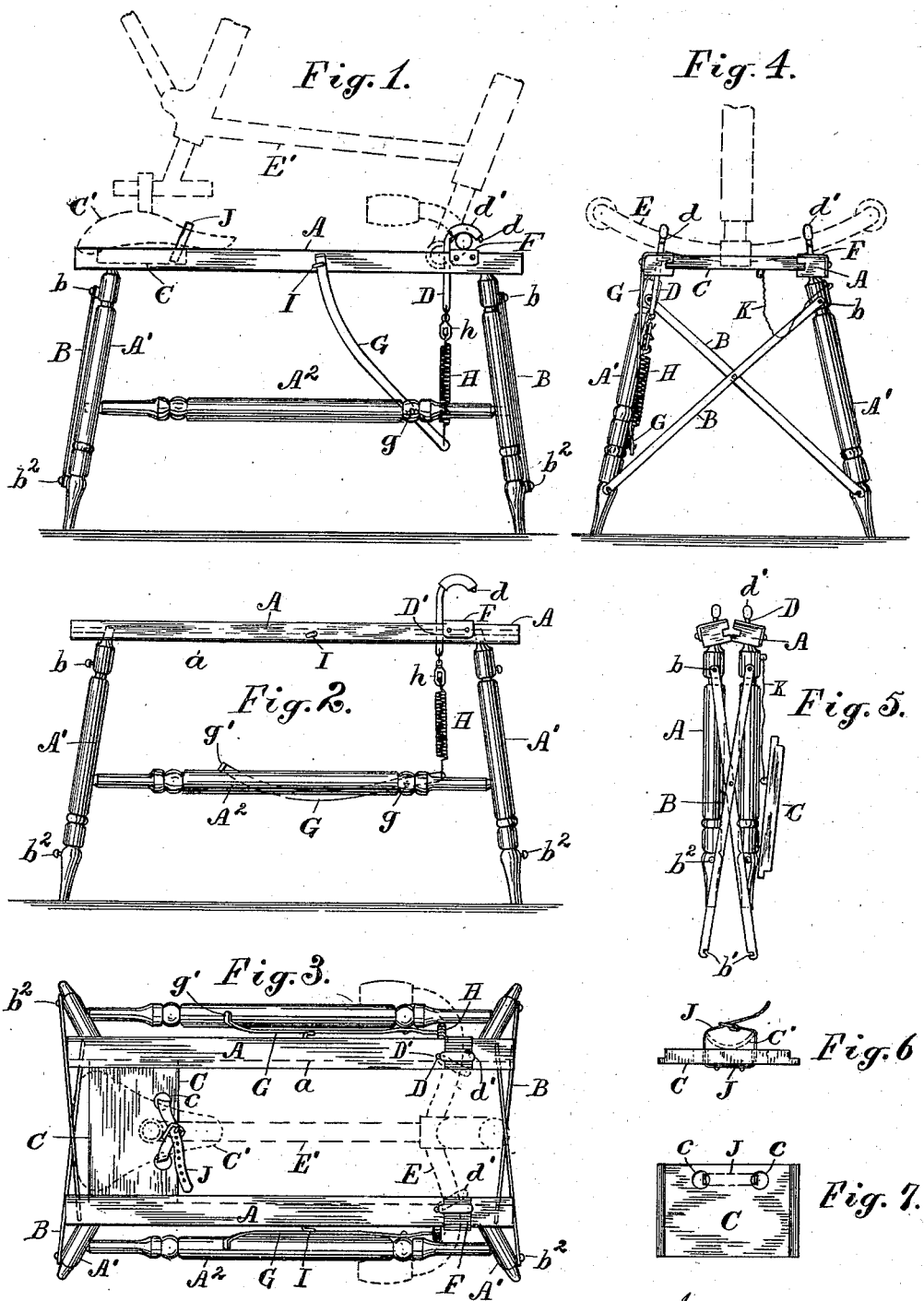

CHARLES COLSTEN, OF JERSEY CITY, NEW JERSEY.

STAND FOR CLEANING AND REPAIRING BICYCLES.

SPECIFICATION forming part of Letters Patent No. 625,746, dated May 30, 1899.

Application filed May 24, 1898. Serial No. 681,549. (No model.)

*To all whom it may concern:*

Be it known that I, CHARLES COLSTEN, a citizen of the United States, residing at Jersey City, county of Hudson, State of New Jersey, have invented certain new and useful Improvements in Stands for Cleaning and Repairing Bicycles, fully described and represented in the following specification and the accompanying drawings, forming a part of the same.

The object of this invention is to furnish a stand for holding a bicycle firmly in an inverted position to afford access to all parts of the machine for cleaning or repairing the same.

This stand is of especial value in bicycle repair-shops, as it holds the bicycle at a convenient elevation for working upon the same and removing or adjusting the wheels and running parts. It is equally convenient for holding the bicycle to clean, oil, or varnish the same.

Where the stand is designed for use at intervals only, it is preferably made collapsible, so that it may be folded together and thus occupy less space. It is thus adapted for bicycle users who have limited accommodations for such a stand.

The collapsible stand consists of two side frames having each a top rail, with a carriage fitted movably to such rails to support the seat of the inverted bicycle and having jointed braces at the ends of the frame to hold them in position for use with a carriage fitted to the rails.

The holding apparatus for the bicycle consists especially of clamps provided one upon each of the top rails to grip the arms of the handle-bar, and I have provided such clamps with spring-pressers adapted to grip such arms elastically, so that the clamp may be actuated by a lever having a uniform movement. By such construction the clamp is made self-adjusting to handle-bars of different dimensions, and I also make the clamps to swivel in the frame of the stand, so that they may adapt themselves readily to handle-bars of different curvatures.

In the annexed drawings, Figure 1 is a side elevation of the apparatus with the clamps pressed upon a handle-bar, the parts of the bicycle which rest upon the stand being shown in dotted lines. Fig. 2 is a side elevation of the stand with the clamp released to free the bicycle. Fig. 3 is a plan of the stand with the bicycle parts in dotted lines. Fig. 4 is an end elevation of the apparatus with one of the front legs removed to expose the clamping devices, the handle-bars and steering-head of the bicycle being shown in dotted lines. Fig. 5 is an end elevation of the apparatus collapsed. Fig. 6 is an end view of the carriage detached from the stand, showing the nose of a saddle, in dotted lines, strapped upon the carriage; and Fig. 7 is a plan of the carriage, showing the attachment of the strap to the same.

The side frames of the stand are shown formed of wood having a top rail A, end legs A', and cross-bar $A^2$ between the legs. Metallic braces B are shown pivoted together intermediate to their ends and their upper ends pivoted upon screws $b$ on the legs near the top. The lower ends of the legs are furnished with studs $b^2$, and the lower ends of the braces are formed with notches $b'$, as shown in Fig. 4, to engage the studs when holding the frame in its operative position, as shown in this figure. The braces then form diagonals, which hold the frame firmly at both ends. When the braces are detached from the studs $b^2$, the stand may be collapsed, with the side frames in close contact, as shown in Fig. 5.

The rails A are formed each upon the inner side with a groove $a$, and the carriage C is formed of a piece of wood fitted to the grooves, and thus adapted to set beneath the saddle C' of the bicycle, as shown in Figs. 1 and 3. A vertical clamp-rod D is extended through each of the rails near one end and provided at the top with a clamp-hook $d$, having rubber covering $d'$ to embrace the arms E of the handle-bar. An india-rubber plate or pad F is applied to the top of the rail where the handle-bar rests upon the same when gripped by the clamp. To press the clamp (consisting of the rod D and hook $d$) downward elastically, I pivot a hand-lever G upon the side of the frame, a screw $g$ in the cross-bar $A^2$ furnishing a suitable fulcrum, and connect one end of the lever with the clamp-rod D by a spring H and a swivel $h$. A catch I is provided outside of the top rail to engage the opposite end of the lever when elevated, which operates to draw the clamp elastically downward, as shown in Fig. 1.

The free end of the lever G is formed with a bend $g'$ to rest upon the cross-bar $A^2$ when the lever is released from the catch I, and the spring H is then relieved from tension and the clamp may be raised, as shown in Fig. 2, to insert the handle-bars beneath the hooks $d$. The rail is preferably provided with a metallic bushing $D'$ to diminish the friction of the clamp-rod where in contact with the rail. The swivel $h$ permits the clamp-rod to be turned around in any position to bring the hook $d$ at right angles to the curve of the handle-bar.

In Fig. 3 the handle-bar E is shown in dotted lines with arms crossing the rails A at right angles, and the hooks $d$ are shown in full lines turned parallel with the rails to properly embrace such bars; but the hooks are also shown in dotted lines (indicated by the letter $d'$) turned at a different angle to indicate the capacity of the clamps for turning in any direction.

In Fig. 3 the carriage C is shown provided with holes $c$, through which the ends of a strap J are projected upwardly and secured by a buckle over the pommel of the bicycle-saddle, (indicated by the dotted lines $C'$.) The strap is preferably passed through both of the holes around the under side of the saddle, as shown in Fig. 6, where it would be secured by nailing, and it is thus adapted to embrace the pommel of the saddle or the top bar of the bicycle, (designated $E'$ in Figs. 1 and 3.)

In applying the bicycle to the stand the strap J is unbuckled and the levers G of the clamps are thrown downwardly, as shown in Fig. 2. The bicycle is then inverted and the handle-bars placed upon the pads F, and the carriage C is moved in the grooves $a$ to fit beneath the saddle $C'$. The saddle or top bar $E'$ is then secured by the strap J, and the arms of the handle-bar are firmly clamped by raising the levers G, as shown in Fig. 1, which holds the clamp-hooks $d$ pressed firmly upon the handle-bars by the tension of the springs H. The tension of the springs is so adjusted as to hold the bicycle firmly in an inverted position, and the legs $A'$ are sufficiently spread to hold the bicycle steadily while the operator is engaged in cleaning or repairing the same.

By constructing the frame of the apparatus of wood it is very cheaply made, and by making it collapsible, as shown in Fig. 3, it is readily adapted to transport or to store in a limited space. The carriage C may be made of suitable size to support the saddles of various bicycles without adjusting the carriage upon the frame; but the groove $a$ in the rails of the frame is very inexpensive and adapts the saddle to move longitudinally. The carriage may be connected to one of the legs $A'$ by a cord or chain K, as shown in Figs. 4 and 5, to prevent the carriage from being lost when the frame is collapsed.

It is immaterial how the clamps are pressed elastically upon the handle-bars, and the spring may be secured by making the levers G flexible and dispensing with the springs H. The nature of the braces B is also immaterial, as the essential feature of the frame is the use of two separate side frames with suitable braces at the ends to hold the same erect when in use.

Having thus set forth the nature of my invention, what I claim herein is—

1. In a bicycle-stand, the combination, with the side frames consisting each of the grooved top rail, the wooden legs, and their tie-bar, of the movable carriage fitted to the grooves in the top rails, and the diagonal braces pivoted each at one end to the end of the frame, substantially as herein set forth.

2. In a bicycle-stand, the combination, with a frame having top rails and a carriage to support the bicycle-saddle, of clamps provided with spring-pressers and adapted to elastically grip the arms of the handle-bar, substantially as herein set forth.

3. In a bicycle-stand, the combination, with a frame having top rails and a carriage to support the bicycle-saddle, of clamp-rods movable vertically through the rails with clamp-hooks upon their upper ends, a lever to depress each of such rods, and a spring connection between the rod and the lever to hold the clamp elastically, substantially as herein set forth.

4. In a bicycle-stand, the side frames consisting each of the grooved top rail A, the wooden legs $A'$ and their tie-bars $A^2$ combined with the movable carriage fitted to the grooves, the diagonal braces pivoted upon the ends of the frames, as set forth, the clamp-rods movable vertically through the rails with hooks upon their upper ends to grip the arms of the handle-bar, the levers G pivoted upon the ties $A^2$, and the spring-and-swivel connection between the levers and the clamp-rods, substantially as herein set forth.

In testimony whereof I have hereunto set my hand in the presence of two subscribing witnesses.

CHARLES COLSTEN.

Witnesses:
WILLIAM A. MATTISON,
THOMAS S. CRANE.